United States Patent [19]

Neuman

[11] Patent Number: 4,609,231

[45] Date of Patent: Sep. 2, 1986

[54] FLOPPY DISKETTE STORAGE CONTAINER

[75] Inventor: Eli Neuman, Chatsworth, Calif.

[73] Assignee: Perfectdata Corporation, Chatsworth, Calif.

[21] Appl. No.: 685,896

[22] Filed: Dec. 24, 1984

[51] Int. Cl.⁴ .............................................. A47B 81/06
[52] U.S. Cl. ....................................... 312/15; 312/13; 312/18; 206/387
[58] Field of Search .................... 312/15, 10, 11, 13, 312/18, 19; 206/387

[56] References Cited

U.S. PATENT DOCUMENTS

| | | | |
|---|---|---|---|
| 980,124 | 12/1910 | Pooler | 312/19 |
| 1,038,099 | 9/1912 | Dewar | 312/19 |
| 1,569,207 | 1/1926 | Sears | 312/15 |
| 2,300,333 | 10/1942 | Barton | 312/15 |
| 2,651,556 | 9/1953 | Zaccardo et al. | 312/15 |
| 3,969,007 | 7/1976 | Lowry | 312/15 |
| 4,121,877 | 10/1978 | Brown | 312/19 |
| 4,270,817 | 6/1981 | McRae | 312/18 |

Primary Examiner—Victor N. Sakran

Attorney, Agent, or Firm—Spensley Horn Jubas & Lubitz

[57] ABSTRACT

A container for storing floppy diskettes or similarly shaped objects which enables a selected stored floppy diskette to be located and retrieved rapidly and efficiently is described. The container comprises a box having parallel guideways on opposite sides, the guideways defining storage spaces for the floppy diskettes. A lifter tree comprising a hinged support arm corresponding to each floppy diskette and located within the space for each floppy diskette is swingable to raise the floppy diskette. A rotating camshaft extending the length of the storage container has cams corresponding to each support arm, the cams corresponding to adjacent support arms being located at different radial positions around the camshaft. The cams engage lever arms located on the support arms of the lifter tree. The floppy diskettes may have identification labels located near their top edges serially scanned by rotating the camshaft, thereby serially engaging the cams with the lever arms of the support arms serially swinging the support arms and serially raising the floppy diskettes.

14 Claims, 7 Drawing Figures

FLOPPY DISKETTE STORAGE CONTAINER

BACKGROUND OF THE INVENTION

1. Field of the Invention

This invention is concerned with a container for storing floppy diskettes or similarly shaped objects, and in particular is concerned with such a container provided with a means for quickly identifying and removing a selected floppy diskette from among the others in the container.

2. Prior Art

In recent years, the use of computers in large enterprises, small enterprises and homes has proliferated. Many of these computers use flexible magnetic disks for information storage. These flexible magnetic disks are available in several sizes and usually comprise a thin rotatable disk having a magnetically encodable surface, the disk being disposed usually in an essentially square cardboard pocket or a plastic holder. In common parlance, these flexible magnetic disks are often known as floppy disks or floppy diskettes.

Not only are data bases commonly stored on floppy diskettes, but applications programs which a computer owner may purchase or develop are also stored on the diskettes. Other information related to the use of a computer, such as pseudo-programs may also be so stored. A single user of a computer may, therefore, have an array of floppy diskettes which he or she uses at different times on his or her computer. For example, a single small business may have separate floppy diskettes dedicated to several different data bases such as customer lists, supplier lists, inventory, mailing lists, among others, as well as a variety of applications programs such as, word processing, spread sheet analysis, payroll generation, to name only a few. Even in a word processing context, there may be a separate floppy diskette, or several floppy diskettes, dedicated to the writings generated by each individual within the organization. Hence, the need arises for the ability to be able to quickly select and retrieve any desired floppy diskette from among all the floppy diskettes that may be at the computer user's disposal while at the same time providing for the safe storage of the flexible diskettes that are not in use.

One presently known method that is used to store floppy diskettes in an orderly manner comprises storing the floppy diskettes one behind another in a box-like container and using dividers to separate the floppy diskettes into identified categories, in a manner analogous to a card file system used in a library. In order to select and retrieve a desired floppy diskette, therefore, the proper category is first located and the floppy diskettes behind the appropriate divider are then individually flipped until the desired one has been selected and can be retrieved.

A number of shortcomings exist with respect to this method of selecting and retrieving floppy diskettes. First, as the floppy diskettes are being individually flipped in order to select the desired one within a category, they are being unnecessarily handled by human hands. This enhances both the risk of contamination and the possibility of mechanical damage. Such a risk which attends the human handling of floppy diskettes, while perhaps minimal, should be avoided wherever possible in order to decrease the possibility of the loss of information as well as to decrease the dependence upon backup diskettes. Other shortcomings arise from the possibility that two or more floppy diskettes may be inadvertently flipped rather than one at a time. Indeed, misfiling of the desired floppy diskette may result in the same floppy diskettes being flipped several times during the search for a selected one.

SUMMARY OF THE INVENTION

It is an objective of the present invention to provide a storage container for floppy diskettes in which the floppy diskettes are not only stored safely and securely, but can be selected and retrieved therefrom efficiently and with a minimum amount of human handling. To achieve this objective the present invention comprises an essentially box-like container provided with guideways along its opposite sides adjacent to the side through which the floppy diskettes are removed. The guideways along each side are parallel to one another and equally spaced so that a single floppy diskette fits between adjacent guideways. The floppy diskettes are, therefore, insertable into the container by positioning them between the corresponding guideways on each side of the container and sliding them along the guideways into the container. The floppy diskettes are arranged in the container essentially parallel to one another.

A unique mechanism is used to support the floppy diskettes and to enable their rapid and easy identification and retrieval from the container. This mechanism comprises a support member for each floppy diskette. The support member is swingable within the space between the guideways so that the uplifted end of the support member causes the floppy diskette to slide upward in the guideways. The support member is coupled by means of a hinge to another member which is fixed with respect to the sides and bottom of the container.

A camshaft extends the length of the container parallel to the sides beneath the support members. Cams corresponding to each support member are located along the camshaft, the individual cams being positioned at different radial positions around the camshaft. Each support arm is provided with a short lever for engagement with the cams. As the camshaft is rotated, the cam corresponding to the support arm for a particular floppy diskette presses upon the lever causing the support arm to swing so that the floppy diskette slides upward in its guideways extending above the others in the container and enabling an identification label placed on the diskette to be read. As the camshaft is rotated further, the cam rotates beyond the lever, no longer engaging it, so that the weight of the floppy diskette presses downward on the uplifted portion of the support arm, the floppy diskette sliding back into its stored position in the container. In the interim, the next succeeding cam presses on the lever of the support arm for the adjacent floppy diskette causing that floppy diskette to slide upward in the guideways so that its identification label may be read.

Similarly, the rotating camshaft successively causes the cams corresponding to successive floppy diskettes in the container to act upon the support arms of the successive floppy diskettes so that they are successively individually raised and lowered. In this manner, the desired floppy diskette may be selected, and once selected may be grasped and slid out of the container along the guideways.

With the present invention, each of the floppy diskettes in the container may be individually lifted above the other floppy diskettes and identified without being touched by human hands. Thus, the important objective of minimizing human contact with the floppy diskettes is achieved without compromising rapid selection and retrieval of the desired diskette.

The present invention is not limited to use with floppy diskettes, but may be used advantageously with other thin flat objects.

DESCRIPTION OF THE PREFERRED EMBODIMENT

The following detailed description is of the best presently contemplated modes of carrying out the invention. This description is not to be taken in a limiting sense, but is made merely for the purpose of illustrating the general principles of the invention, since the scope of the invention is best defined by the appended claims. The preferred embodiment first described with reference to the drawings is a storage container having special utility for use with 3½ inch floppy diskettes. The storage container of this preferred embodiment has a capacity of storing approximately 20 floppy diskettes which can be serially scanned by rotation of a camshaft engaging a lifter tree. Rotation of the camshaft successively raises and lowers the individual floppy diskettes, permitting their identification labels to be scanned so that the desired floppy diskette may be selected and retrieved.

Figure 1:
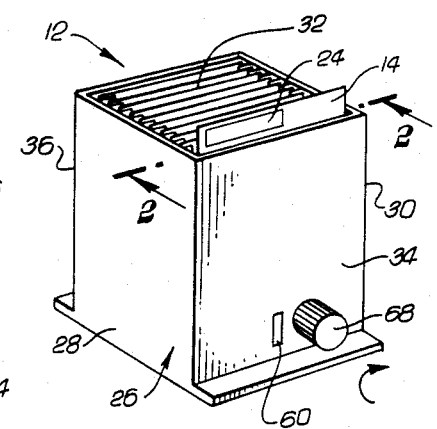
FIG. 1 is a perspective view of a preferred embodiment of the present invention.

With reference first to FIG. 1, the storage container 12 of the present invention is shown in perspective. When not in use, storage container 12 may be covered by a top (not shown) to protect the floppy diskettes within storage container 12 from contamination by dust and other environmental factors.

Figure 2:
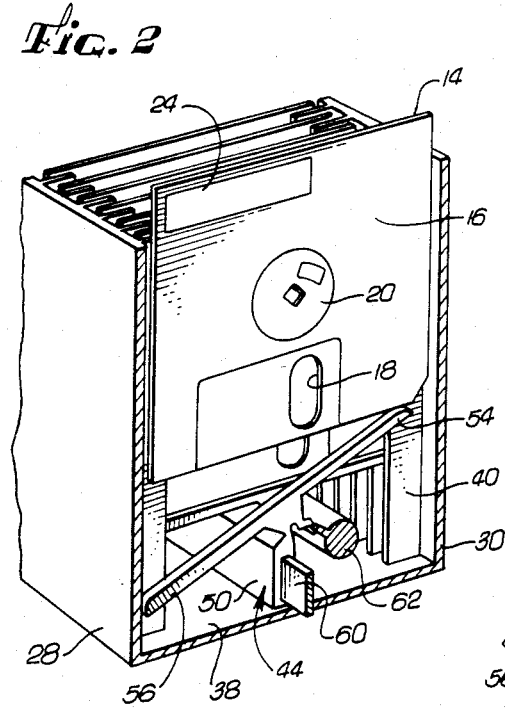
FIG. 2 is a partial view, cutaway, of the preferred embodiment of the present invention shown in FIG. 1, taken along the lines 2-2 of FIG. 1.
Figure 4:
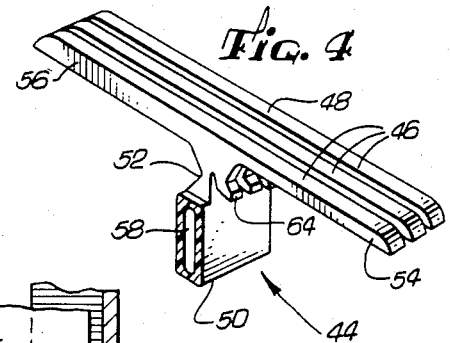
FIG. 4 is a perspective view of the lifter tree used in the preferred embodiment of the present invention.

A cutaway view of the storage container 12, taken along the lines 2-2 of FIG. 1, is shown in FIG. 2. As can be seen in FIG. 2, the floppy diskette 14 for which the storage container 12 is adapted comprises an essentially flat, essentially square plastic housing 16 containing an opening 18 through which access to the thin, rotatable magnetically encodable disk 20 contained in housing 16 is provided for the magnetic heads in a computer. The floppy diskette 14 is provided with an identification label 24 upon which information identifying the particular floppy diskette 14 and/or the information carried thereon may be placed.

The storage container 12 of the present invention comprises an essentially rectangular parallelpiped box 26 having first and second sides 28 and 30 which are parallel to one another and adjacent to the top side 32 of the box 26 which is open or openable and through which the floppy disks 14 are inserted and removed. Box 26 has first and second ends 34 and 36 which are parallel to one another and at right angles to the first and second sides 28 and 30. Bottom side 38 is perpendicular to and meets first and second sides 28 and 30 and first and second ends 34 and 36. Bottom side 38 may extend slightly beyond first and second ends 34 and 36. First and second sides 28 and 30, first and second ends 34 and 36, and bottom side 38, in the preferred embodiment, are flat rectangular, rigid members fabricated of plastic, although other materials are also suitable. These members are joined to one another according to conventional techniques.

The first and second sides 28 and 30 are each provided with a set of parallel, equally spaced guideways 40 parallel to the first and second ends 34 and 36 and extending from the bottom side 38 to the top side 32 of box 26.

In the preferred embodiment, the guideways 40 are integrally molded with the first and second sides 28 and 30 with a spacing between adjacent guideways 40 (or between the terminal guideways 40 and the first end 34 or second end 36) slightly greater than the thickness of the floppy diskettes 14 to be stored. The spacing between the tips of corresponding guideways 40 located on opposite sides 28 and 30 of box 26 is less than the width of the floppy diskettes 14 so that the first and second sides 28 and 30 and the guideways 40 define essentially parallel spaces 42, each sized to accommodate one floppy diskette 14 and constraining the movement of the floppy diskettes 14 to an up and down motion along the guideways 40.

A lifter tree 44 is disposed at the bottom of box 26. Lifter tree 44 has a support arm 46 corresponding to each space 42. Support arm 46 is a bar like member having a flat upper surface 48 on which a floppy diskette 14 rests when inserted into the box 26. The length of support arm 46 is slightly less than the width of the box 26 between the first and second sides 28 and 30 while the width of the support arm 46 in the direction parallel to the first and second sides 28 and 30 is slightly less than the spacing between adjacent guideways 40.

Lifter tree 44 has a stationery portion 50 which is fixed with respect to the box 26 and which is connected to the support arms 46 by means of hinges 52, preferably located approximately equidistant from first and second sides 28 and 30. Each support arm 46 is, therefore, independently rotatable about the corresponding hinge 52 through an arc within the corresponding space 42 for a floppy diskette 14. When support arm 46 rotates, raising the first end 54 and lowering the second end 56 of support arm 46, a floppy diskette 14 located within the space 42 is moved vertically upwards within the guideways 40 above the sides 28 and 30 and ends 34 and 36 of box 26 and above the other floppy diskettes 14 held by the storage container 12 so that the identification label 24 of the floppy diskette 14 can be easily and readily examined.

In the preferred embodiment, the lifter tree 44 is fabricated of a single piece of polypropylene plastic. The hinges 52 in the preferred embodiment are "live" hinges, narrow necks of polypropylene plastic which have the capability of being elastically bended back and forth many times without significant weakening or breaking, yet having sufficient rigidity to support a load such as the support arm 46 and a floppy diskette 14 resting upon it.

In the preferred embodiment, the stationary portions 50 of the lifter tree 44 are provided with openings 58 in each end of the stationary portion 50 extending in a direction parallel to the first and second sides 28 and 30. Fixing pins 60 are attached to the first and second ends 34 and 36 and are sized and located to be insertable into openings 58 to secure lifter tree 44 to box 26. Fixing pins 60 may be integrally molded as a part of first and second ends 34 and 36 and inserted into openings 58 of lifter tree 44 during fabrication of the box 26.

During the storage of floppy diskettes 14 in storage container 12, the support arms 46 supporting the floppy diskettes 14 are all horizontal.

A rotating camshaft 62 is used to serially rotate the support arms 46 on the hinges 52. Toward this end, each support arm 46 is provided with a short lever arm 64 which extends from a portion of the support arm 46 proximate to hinge 52. Camshaft 62 extends between the first and second ends 34 and 36 and is mounted in oppositely disposed openings 66 located in the first and second ends 34 and 36 which serve as camshaft bearings. Camshaft 62 extends through the first end 34, and a control knob 68 is mounted on its end. The turning of knob 68, therefore, causes camshaft 62 to rotate.

Figure 3:
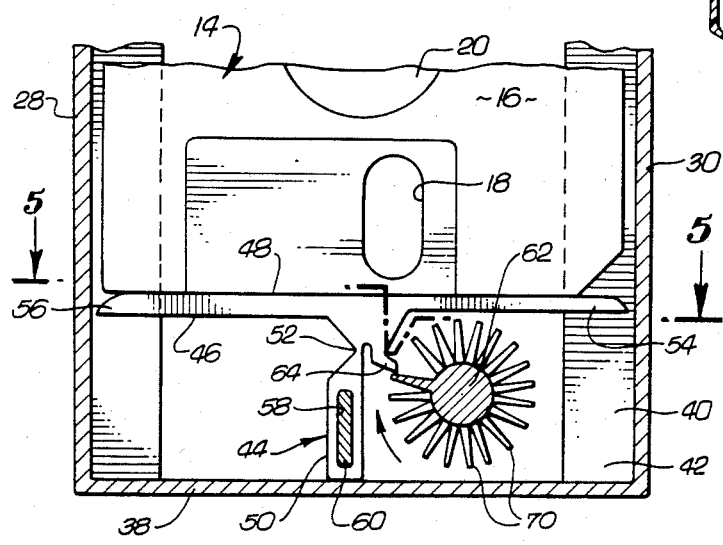
FIG. 3 is a cutaway view of the preferred embodiment of the present invention.
Figure 5:
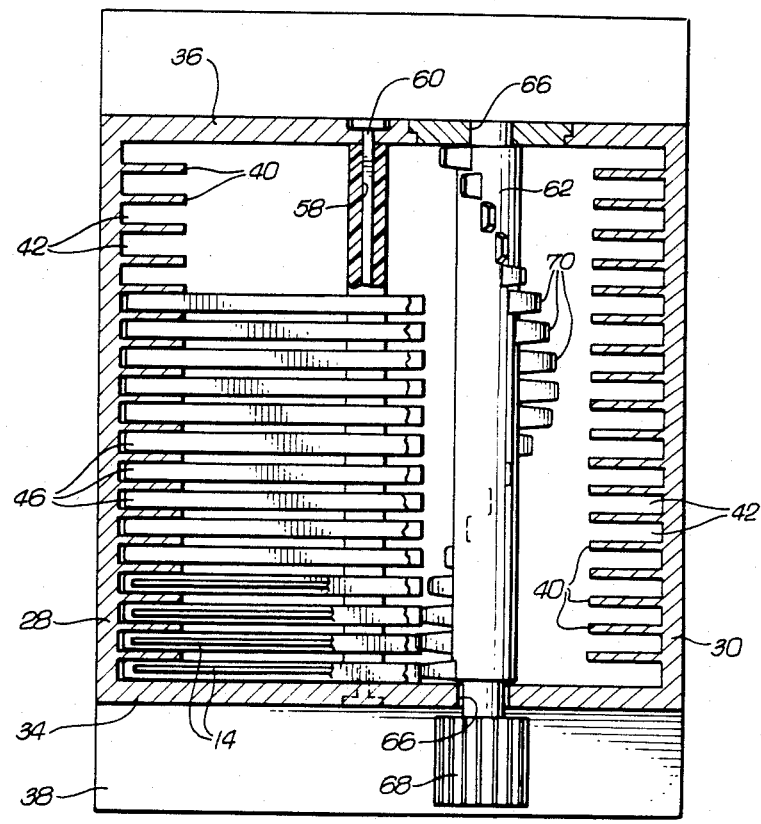
FIG. 5 is an overhead, cutaway view of the present invention taken along the lines 5—5 of FIG. 3.
Figure 6:
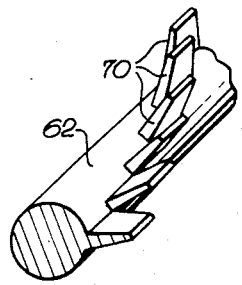
FIG. 6 is a perspective view of a portion of the camshaft used in the preferred embodiment of the present invention shown in FIGS. 1 through 5.

Camshaft 62 is provided along its length with cams 70. Each of the cams 70 is located along the length of camshaft 62 on camshaft 62 within a different space 42, as can be seen in FIG. 5, and at a different radial position around the camshaft 62, as shown in FIGS. 3 and 6. In the preferred embodiment, camshaft 62 and cam 70 are integrally molded from a single piece of plastic. Alternatively camshafts 62 and cam 70 can be molded in linear sections, the linear sections couplable to one another by cooperating splines molded into their ends or other mechanisms generally known for such purpose.

Camshaft 62 is located so that the ends of the cams 70 engage the lever arms 64 of the support arms 46 as the camshaft 62 is rotated by knob 68. Since the cams 70 are all located at different radial positions around camshaft 62, the engagement of each of the cams 70 with the corresponding lever arms 64 will occur at different times during a rotation of the camshaft 62 by knob 68. As can be seen in FIG. 3, as knob 68 is turned rotating camshaft 62, the end of a cam 70 will press against the lever arm 64 causing the first end 54 of support arm 46 to swing upward as shown in FIG. 2. This causes the floppy diskette 14 to slide upwards in storage container 12 along guideways 40 so that its uppermost portion including the identification label 24 is above the top of the box 26, enabling the identification label 24 to be read.

As the knob 68 is turned further, the cam 70 which is pressing upon the lever arm 64 rotates beyond the lever arm 64 and out of engagement with it so that hinge 52 returns support arm 46 to its normal horizontal position assisted by the weight of the floppy diskette 14 pressing downwards. Simultaneously, the next adjacent cam 70 begins pressing upon the lever arm 64 of the corresponding support arm 46 located in the adjacent space 42 causing the first end 54 of support arm 46 to swing upward in the same manner as has been described to cause the adjacent floppy diskette 14 to be moved upward in guideways 40 so that the identification label 24 on it may be read, the first floppy diskette 14 having returned to its usual storage position within the box 26.

It will be appreciated that as knob 68 is turned clockwise, the individual floppy diskettes 14 will be serially raised and then lowered within guideways 40 enabling the identification labels 24 to be serially read. After the turning of the knob 68 has resulted in the locating of a desired floppy diskette 14, the partially uplifted floppy diskette 14 selected may be easily retrieved from storage container 12 by lifting it further upward along the guideways 40 through the top side 32.

It will be noticed that in the preferred embodiment, the second end 56 of support arm 46, i.e., the end of the support arm 46 on the opposite side of hinge 52 as camshaft 62, is thicker than the first end 54 of support arm 46. When there is no floppy diskette 14 placed in a space 42, support arm 46 will therefore tend to tilt on hinge 52 slightly so that the second end 56 is lower than the first end 54. With the support arm 46 in this position, the cam 70 will not contact the lever arm 64. This prevents a possible jamming between end of the lever arm 64 and the end of the cam 70 which might result if the support arm 46 were tilted by chance some critical amount with the second end 56 higher than the first end 54. Alternatively, a spring may be connected between the second end 56 and a position on the box 26, such as the bottom side 38, or the hinge 52 may be biased to produce the same result.

While the present invention has been described with reference to a particular preferred embodiment, it should be recognized that there are many embodiments of the present invention possible. Only a few of the many variations possible will be described herein, it being understood that this description is not intended to be exhaustive of all such possible embodiments of the present invention.

Figure 7:
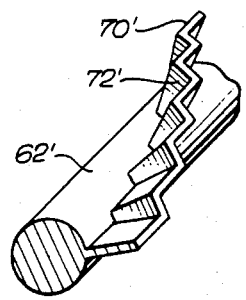
FIG. 7 is a perspective view of a portion of an alternate embodiment of a camshaft for use in the present invention.

One example of an alternate embodiment of the present invention comprises a camshaft 62' in which the individual cams 70' are actually attached to one another by radial disk segments 72' as shown in FIG. 7. The radial disk segments 72' which connect the cams 70' to one another increase the rigidity of the cams 70'. In addition, the configuration of FIG. 7 provides certain advantages of fabrication where the camshaft 62' with the cams 70' and the disk segments 72' are integrally molded from a single piece of plastic.

As another example, while polypropylene plastic is used in the preferred embodiment for the lifter tree 44, other materials and constructions may be used. For example, the support arms 46 and the fixed portions 50 of the lifter tree assembly 44 may be fabricated of aluminum with a thin flat steel spring used as the hinge 52. Such a steel spring would be inserted into cracks fabricated in the support arm 46 and in the fixed portion 50 and would permit the support arm 46 to be swung with respect to the fixed portion 50 in a manner similar to that of the preferred embodiment described above.

In yet another embodiment of the lifter tree, a hinge consisting of a pivot pin in a barrel may be used to attach the support arm 46 to the fixed portion 50 of the lifter tree. While the lifter tree 44 has been described with reference to a construction in which a single piece of material is used to form all the stationary fixed portions 50, it should be realized that there may be a stationary fixed portion 50 corresponding to each support arm and these individual lifter assemblies may subsequently be individually attached to the bottom side 38 of the box 26 or to each other. One such construction, which would also be suitable for use with the lifter tree 44 would be to provide a track on the bottom side 38 in which feet on the stationary portions 50 would be insertable and secured by insertion therein.

It will be recognized, especially with reference to FIG. 3, that geometrical considerations determine the number of floppy diskettes 14 that can be sequentially, individually displayed. In particular, the use of longer cams 70, and consequently a camshaft 62 placed further from hinge 52 than the embodiment shown in FIG. 3, while requiring a larger box 26, would allow a greater number of floppy diskettes to be accommodated. This is because the cams 70 could be more closely spaced angularly in the radial direction as the same displacement at the lever arm 64 of the tips of cams 70 subtends less of an angle for a long cam than for a short cam.

Another embodiment of the present invention is one in which the floppy diskettes 14 are sequentially raised beginning with the diskette proximate to the second end 36 and continuing towards the first end. In this configuration, the spiral around the camshaft 62 defined by the cams 70 would be oriented in the direction opposite to that shown in the figures. With this configuration, it might be acceptable to raise a floppy diskette before the floppy diskette in back of the one being raised is lowered since the floppy diskettes are raised sequentially from back to front, rather than front to back. In such a circumstance, the cams 70 may be spaced closer radially than in the described preferred embodiment. With such a configuration, more floppy diskettes could be scanned during one complete rotation of the camshaft than would be the case where the floppy diskettes are scanned from front to back since in scanning from front to back it is required that one floppy diskette be lowered so that the one immediately behind it can be scanned.

There are many other configurations and variations of the present invention that fall within its scope, and the present invention should therefore not be considered to be limited by the descriptions hereinabove given.

What is claimed is:

1. A storage container for floppy diskettes or the like comprising:
    a plurality of spaced-apart pairs of parallel guides, the members of each pair located on opposite parallel first and second sides of said storage container, said spaced-apart pairs of parallel guides defining adjacently located parallelly oriented storage spaced for floppy diskettes in said container, said floppy disks insertable in and removeable from said storage spaced along said guides through a third side in said container adjacent said first and second sides;
    a lifter means located within each storage space for supporting and moving said floppy diskettes, said lifter means having a first portion fixed with respect to said first and second sides and a second portion coupled to said first portion and swingable about an arc in a plane perpendicular to said first and second sides to move said floppy diskettes in said storage container along said guides partially out of said container through said third side; and
    a camshaft extending through said storage spaces parallel to said first and second sides, said camshaft being provided along its length with a cam corresponding to each storage space, the cams for adjacent storage spaces being located at different positions around said camshaft, each cam engageable with the corresponding second portion of said lifter means in said storage space when said camshaft is rotated to swing said second portion to move said floppy diskette in said storage container along said guides partially out of said container through said third side, said floppy diskettes being moved along said guides partially out of said container serially when said camshaft is rotated.

2. A storage container as in claim 1 wherein said second portion of said lifter means comprises a first arm for contacting said floppy diskette and a second arm for engagement with the corresponding cam.

3. A storage container as in claim 1 wherein said first and second portions of each said lifter means are coupled by a hinge.

4. A storage container as in claim 3 wherein said hinge is a live hinge and said first and second portions of said lifter means and said hinge are fabricated from a single piece of material.

5. A storage container as in claim 4 wherein said first portions of said lifter means are fabricated from a single piece of material.

6. A storage container as in claim 4 wherein said single piece of material is a polypropylene plastic.

7. A storage container having a bottom and lateral sides for essentially flat objects comprising:
    a plurality of adjacent parallel storage spaces open along one side for removal and insertion therein of said objects;
    guiding members parallel to one another separating the storage spaces for guiding said objects while said objects are being moved into or out of said storage spaces;
    a moveable member disposed in each storage space opposite the side along which said storage space is open for pushing, when said moveable member is pressed against, an object in said storage space so that the object is partically moved out of said storage space; and
    a moveable shaft traversing said storage spaces and provided with a cam corresponding to each moveable member, each said cam pressing against and moving said corresponding moveable member during a portion of the movement of said shaft in order to push an object in said storage space so that it is moved partially out of said storage space, said cams arranged along said shaft so that objects in adjacent storage spaces are pushed a predetermined minimal amount partially out of said storage spaces at different positions of movement of said shaft.

8. A storage container as in claim 7 wherein adjacently located cams are located at spaced intervals about the circumference of said shaft, and wherein said shaft is rotatable to cause said cams to be serially pressed against and move said members, whereby objects in said storage spaced are serially pushed partially out of said storage spaces.

9. A storage container as in claim 8 wherein said storage spaces are oriented so that their open sides are oriented upward whereby said objects which are serially pushed out of said storage spaces serially fall back into said storage spaces under the influence of gravity when said shaft is rotated so that said member no longer push against said objects.

10. A storage container as in claim 9 further comprising a hinge for coupling said moveable member to said sides and wherein said moveable member is a member rotatable within said corresponding storage space.

11. A storage container as in claim 10 wherein said moveable member comprises a first arm for pushing, proximate to one end of said arm, an object in said corresponding storage space and a second arm against which the corresponding cam presses to rotate said member.

12. A storage container as in claim 11 wherein said hinge is a live hinge.

13. A storage container as in claim 12 wherein said moveable member and said live hinge are fabricated of a single piece of material.

14. A storage container as in claim 13 wherein said single piece of material is a piece of polypropylene plastic.

* * * * *